Feb. 6, 1923.
A. E. BURDIN.
PIPE FITTING.
FILED FEB. 24, 1920.
1,444,727.
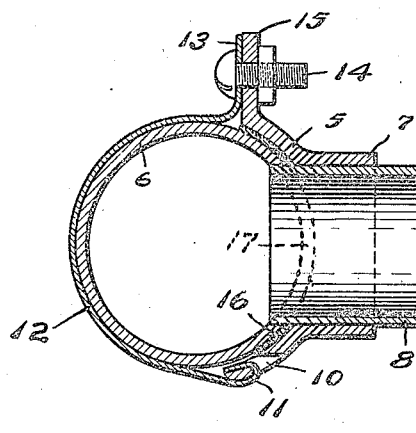
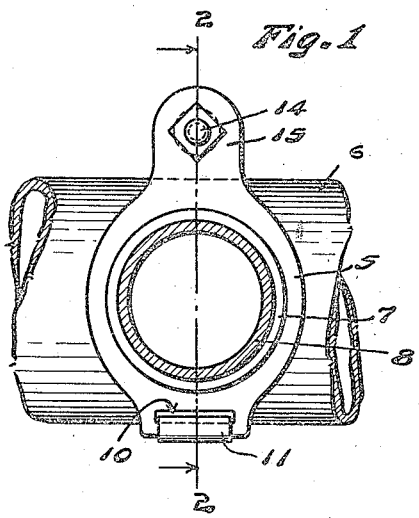
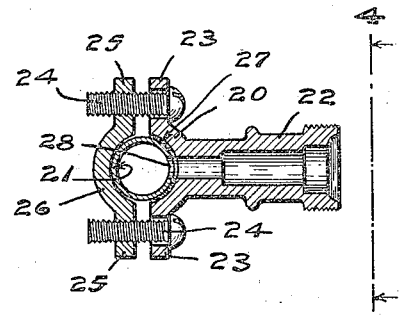
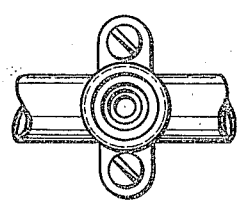
Inventor
Adelbert E. Burdin
By his Attorney
Frank Warren Patented Feb. 6, 1923.

1,444,727

UNITED STATES PATENT OFFICE.

ADELBERT E. BURDIN, OF SEATTLE, WASHINGTON.

PIPE FITTING.

Application filed February 24, 1920. Serial No. 360,941.

*To all whom it may concern:*

Be it known that I, ADELBERT E. BURDIN, a citizen of the United States, residing at Seattle, in the county of King and State of Washington, have invented a certain new and useful Improvement in Pipe Fittings, of which the following is a specification.

My invention relates to improvements in pipe fitting that is adapted to make a branch connection between two pipes and the object of my invention is to provide a pipe fitting that will enable a branch connection to be made with a section of pipe without cutting and threading the same.

A further object is to provide a pipe fitting that is inexpensive to manufacture and simple in its plan of construction and one that is efficient in operation and not liable to leak and that may be quickly and easily installed.

My invention consists in the novel construction, adaptation and combination of parts of a pipe fitting as will be more clearly hereinafter described and claimed.

In the accompanying drawings Figure 1 is a view in elevation of a pipe fitting constructed in accordance with my invention, the branch pipe with which the fitting is connected being shown in cross section and a fragment only of the main pipe to which the fitting is connected being shown.

Fig. 2 is a view in cross section substantially on broken line 2, 2 of Fig. 1.

Fig. 3 is a view in medial cross section showing a slightly modified form of fitting; and Fig. 4 is a view in elevation substantially on broken line 4, 4 of Fig. 3.

Referring to the drawings throughout which like reference numerals indicate like parts, in Figs. 1 and 2 the numeral 5 designates a fitting member that is curved in one direction to conform to the curvature of a pipe 6 of known dimensions and that is provided with an outwardly projecting tubular pipe receiving element 7 which may be internally ground to make a water tight connection with the end of a pipe 8 or which may be internally screw threaded in the manner common to pipe fittings if desired.

One side of the fitting member 5 is provided with a slot 10 wherein is hooked one end 11 of a curved band 12 that is arranged to extend around the pipe 6 and is turned outwardly at its other end as at 13 and perforated for the reception of a bolt 14 by which the band 12 is secured to an outwardly directed flange 15 on the fitting member 5.

In installing the fitting shown in Figs. 1 and 2 a pad 16 of packing material is placed on the inside of the fitting member 5, the fitting member is then placed against the pipe at the desired location, the band 12 is hooked within the slot 10 and drawn around the pipe and the bolt 14 is inserted and tightened thus clamping the fitting member 5 securely against the pipe and compressing the packing pad 16 so that a leak proof connection between the pipe 6 and fitting member 5 is formed. A boring or milling tool is then introduced through the pipe receiving element 7 and a hole 17 is made in the side of the pipe 6 after which the pipe 8 may be introduced into the pipe receiving element 7. If desired the hole 17 may be made in the side of the pipe 6 before this fitting is placed on the pipe and the packing 16 may either be in the form of a washer or may have its central portion cut away after the fitting is secured on the pipe 6.

By use of this form of fitting a branch connection with a pipe may be easily and quickly made by an unskilled person and without the use of any tools except a wrench and a tool for drilling or milling a hole in the side of the pipe 6 thus obviating the long and somewhat expensive process of cutting off the pipe, threading the ends and inserting a tee or similar standard fitting.

In Figs. 3 and 4 I have shown a modified form of the invention comprising a fitting member 20 that is provided with a curved recess adapted to fit the curved circumference of a pipe 21. The fitting member 20 has a tubular shank 22 that may be connected with a branch pipe, not shown, and such fitting member 20 is provided with two outwardly projecting perforated flanges 23 that are connected by screws or bolts 24 with similar flanges 25 on a clamp member 26 which performs the same function as the curved band 12 of Figs. 1 and 2.

In installing the device shown in Figs. 3 and 4 a packing member 27 is interposed between the pipe 21 and the fitting member 20 and after the device has been securely clamped on the pipe 21 a drill is inserted through the bore in the tubular shank 22 and a hole 28 is drilled in the side of the pipe 21 thus establishing communication between the main pipe 21 and the tubular shank 22.

The device shown in Figs. 1 and 2 is particularly well adapted for use in low pressure pipes while the device shown in Figs. 3 and 4 is suitable for use on pipes that carry a higher pressure.

From the foregoing description taken in connection with the accompanying drawings, the advantages of the construction and of the method of operation will be readily apparent to those skilled in the art to which the invention relates, and while I have described the principle of operation of the invention, together with the device which I now consider to be the best embodiment thereof, I desire to have it understood that such changes may be made when desired as are within the scope of the invention.

What I claim is:

A pipe-fitting member curved to fit the curvature of the pipe and having a transverse slot in one curved end, its other curved end integrally carrying a flange member, a curved clip arranged to extend around the side of said pipe opposite said fitting member and being hooked at one end for engaging within the transverse slot of the fitting member, its other end adapted to lie against the flange member of the fitting for bolting the same thereto, and a tubular shank projecting from said fitting and arranged to receive a branch pipe, said shank having a passageway to intersect the curved portion of said fitting member.

In witness whereof, I hereunto subscribe my name this 18th day of February A. D. 1920.

ADELBERT E. BURDIN.